Sept. 19, 1961  J. SILVER ET AL  3,000,459
AUTOMATICALLY-OPERATED VEHICLE PARKING BRAKE
Filed Nov. 9, 1959
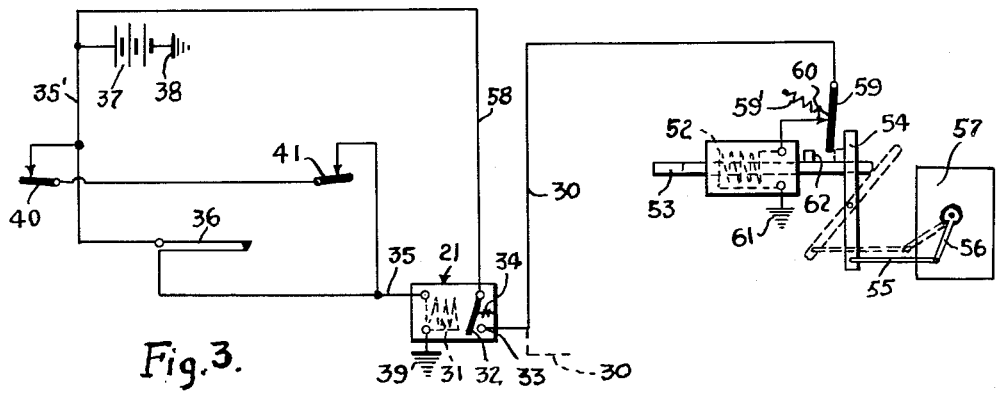
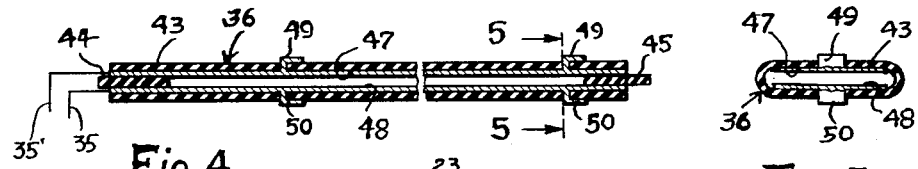
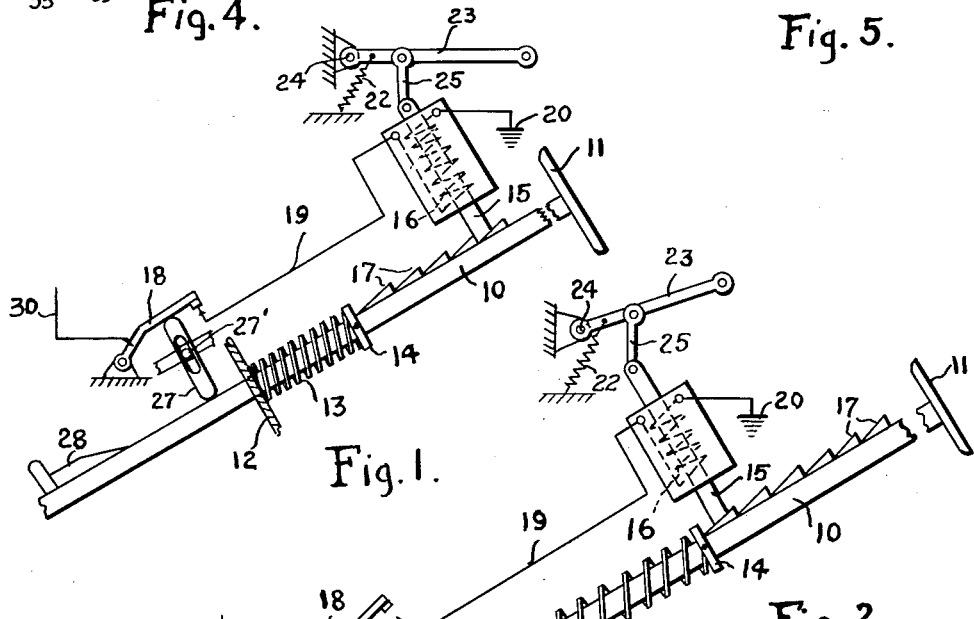
JULIAN SILVER & INVENTORS
DOMENICK A. PUGLIESE
BY L. S. Saulsbury
ATTORNEY

United States Patent Office 3,000,459
Patented Sept. 19, 1961

3,000,459
AUTOMATICALLY-OPERATED VEHICLE
PARKING BRAKE
Julian Silver, 165 Juniper Road, Scarsdale, N.Y., and
Domenick A. Pugliese, 3668 White Plains Road,
Bronx, N.Y.
Filed Nov. 9, 1959, Ser. No. 851,790
3 Claims. (Cl. 180—82)

This invention relates to an automatically-operated vehicle parking brake.

It is the principal object of this invention to automatically cause the fixing of the parking brake of the vehicle upon the operator leaving the vehicle.

It is another object of the invention to provide a parking brake which is automatically set as the operator leaves the seat and opens the doors of the vehicle, as upon leaving the vehicle, and wherein it requires that the operator return to the seat, close the doors and manually disengage the parking brake or lever in order for the vehicle to become operative again.

It is still another object of the invention to provide a safety device and brake applying system for actuating and powering a control lever for automatic transmission to a park position as the driver of the vehicle opens the door of the vehicle and leaves the seat.

Other objects of the invention are to provide a parking brake mechanism, having the above objects in mind, which is of simple construction, has a minimum number of parts, easy to install upon the vehicle, efficient and effective in use, and automatic in operation.

For a better understanding of the invention, reference may be had to the following detailed description taken in connection with the accompanying drawing, in which—

FIGURE 1 is a fragmentary illustrative view of a foot operated parking brake rod being retained in the non-braking position, moved toward the floor, and with the solenoid mechanism therefor to release the brake from the floor position, the operation of the brake being in reverse from that which it is ordinarily operated, FIG. 2 is a similar fragmentary illustrative view of the foot operated brake rod having been released by the solenoid mechanism or by manual disengagement to apply the parking brake, FIG. 3 is a circuit diagram for use by the solenoid for releasing the brake and with the solenoid for operating the automatic transmission control lever to a park position upon the operator leaving the seat and opening the door, FIG. 4 is a fragmentary longitudinal sectional view of a seat switch used in this system, and FIG. 5 is a transverse sectional view of the switch as viewed on line 5—5 of FIG. 4.

Referring now particularly to FIGURES 1 and 2, 10 represents a foot parking brake rod that has a foot plate 11 and which is slidable through a floor 12 against the action of a compression return spring 13 that surrounds the rod and reacts against the floor 12 and is compressed by a ring 14 affixed to the rod 10 as the foot rod is depressed. As shown in FIG. 1 this spring 13 is compressed and the rod is so connected to a foot brake, not shown, that at this time it is in the out of use or non-braking position. The foot brake rod 10 is held in its depressed position by a pawl plunger 15 of a solenoid 16 in its engagement with ratchet teeth 17. This solenoid 16 is energized when current is delivered from a switch 18 through wire 19 and returned to a battery through ground 20. Such current is received through a relay system shown in FIG. 3 that comprises a relay solenoid 21 that is normally energized while the door of the vehicle is closed and the operator is in the seat.

The plunger pawl 15 is kept in contact with the ratchet teeth 17 by a tension spring 22 acting upon a hand lever 23 pivoted upon a fixed part of the vehicle at 24 and connected by a link 25 to the plunger 15. The pawl plunger 15 can be released by hand if desired at any time to permit the brake rod 10 to move to the position of brake application shown in FIG. 2. The spring 22 on the hand lever 23 will return the plunger 15 to the ratchet teeth 17. The spring 13 will have expanded to set the brake. The solenoid will have acted in a similar manner to raise the hand lever 23 and release the plunger 15 from the ratchet teeth 17. To break the solenoid circuit and to permit the return of the plunger 15 to the ratchet teeth, switch 18 is elevated by a lift rod 27 on a guide pin 27' by a cam 28 on the foot rod 10. When the driver is again in the seat and the doors are closed he presses the foot plate 11 against the action of spring 13. As shown in FIG. 3 current will be supplied to the switch 18 from relay 21 through a wire 30. Relay 21 has a solenoid 31 and an armature 32 urged toward a closed contact 33 by a tension spring 34. A wire 35 extends from the relay 21 to a seat switch 36 that is connected by a wire 35' to a battery 37 grounded at 38. The opposite terminal of the solenoid 31 of the relay 21 is grounded at 39, and connected parallel with the seat switch 36 are two series connected door switches 40 and 41 of left and right doors of the vehicle that will be closed so long as the door is closed and so long as the operator is sitting on the seat with the seat switch 36, the seat switch is closed and the relay coil 31 will be energized to maintain relay switch arm 32 in the open position and away from contact 33. Upon these switches being opened first by the driver opening the door and leaving the seat, the relay circuit is opened and the relay arm 32 will close upon the contact 33 to, in the case of the foot brake shown in FIGS. 1 and 2, deliver current through the switch 18 and solenoid 16 to raise the plunger and release the foot rod 10 and cause the brake to be applied. The plunger circuit switch 18 is opened by the lift rod 27 and will remain open until the switch 18 is reset by pressing the foot rod 10 to release the parking foot brake and when the operator is in the seat with the doors closed and ready to drive the vehicle. The seat switch 36 is preferably constructed as shown in FIGS. 4 and 5, from a rubber tube 43 normally held apart at the ends by ends of insulating blocks 44 and 45 and interposed between copper foil contact strips 47 and 48 that are held against the respective upper and lower sides of the tubing by projections 49 and 50 respectively associated with the respective strips. This seat switch 36 is disposed in the seat so that the weight of the driver can close the contacts upon him sitting upon the seat. The door switches 40 and 41 may be of any form and connected in any manner to the doors of the vehicle so upon opening the doors the switches are opened. As shown in FIG. 3 instead of connecting the wire 30 to the solenoid 16 of the foot parking brake rod 10 it can be connected to a solenoid 52 having a plunger 53 that upon the solenoid 52 being energized a transmission lever 54 is pivoted to the park position shown in dotted lines that is in turn connected by a rod 55 to an operating arm 56 of an automatic transmission 57 to move the operating arm 56 to the parking brake position. Current to the solenoids 16 and 52 is supplied from the battery 37 through wire 58, relay contact arm 32, contact 33, wire 30, a contact arm 59 normally closed upon its contact 60, by its tension spring 59', solenoid 52, ground 61 thereof and return to ground 38 of the battery 37. The contact arm 59 is struck by a projection 62 on the plunger 63 as it moves forward to operate the transmission lever 54 so that the solenoid 52 will become deenergized and the cycle of operation thereby completed.

Both the foot brake parking brake and the transmission lever parking brake can be operated by this system or one or the other can be used alone.

In both instances it will be apparent that automatically as the operator leaves the vehicle a parking brake is applied by itself and beyond the control of the operator and that the brakes are not released until he returns to the vehicle, sits in the seat and closes the door, and manually releases the brakes. Then the vehicle may be put into operation. There is no chance for the operator to leave the vehicle without the brakes applied. The vehicles are thereby, upon being parked, with the operator leaving them, prevented from rolling.

While various changes may be made in the detailed construction, it shall be understood that such changes shall be within the spirit and scope of the present invention as defined by the appended claims.

What is claimed is:

1. In a vehicle, a foot brake operating rod, a spring acting on the rod to urge the rod to the position of brake application and said rod when being depressed against the action of the spring serving to release the brake, said brake rod having ratchet teeth, a solenoid having a plunger pawl engageable with the ratchet teeth to normally hold the rod depressed against the action of the spring, said solenoid upon being energized permitting said plunger to be released from the ratchet teeth, biasing means urging the plunger pawl into engagement with the ratchet teeth, relay means conditioned by the closing of the doors of the vehicle serving to energize the solenoid as the doors of the vehicle are opened and switch means associated with the brake rod to deenergize the solenoid when the brake operating rod is being released.

2. In a vehicle, as defined in claim 1, and a hand lever connected to the solenoid plunger to manually release the brake rod.

3. In a vehicle as defined in claim 1, and said relay circuit means further including a seat switch connected in parallel circuit relation with the door switches to be operable therewith upon the driver leaving the seat to set the brake.

References Cited in the file of this patent

UNITED STATES PATENTS

| | | |
|---|---|---|
| 1,880,129 | Gattie | Sept. 27, 1932 |
| 2,285,369 | Smith | June 2, 1942 |
| 2,740,947 | Davies | Apr. 3, 1956 |
| 2,750,010 | Day | June 12, 1956 |
| 2,873,811 | Uffert et al. | Feb. 17, 1959 |
| 2,945,546 | Niederoest | July 19, 1960 |